(No Model.)  3 Sheets—Sheet 1.

G. D. W. LENNON.
VEHICLE TOP.

No. 398,168.  Patented Feb. 19, 1889.

Witnesses.
L. H. Möller
John R. Snow.

Inventor.
Geo. D. W. Lennon.
by his attorney, (No Model.)
G. D. W. LENNON.
VEHICLE TOP.
No. 398,168. Patented Feb. 19, 1889.
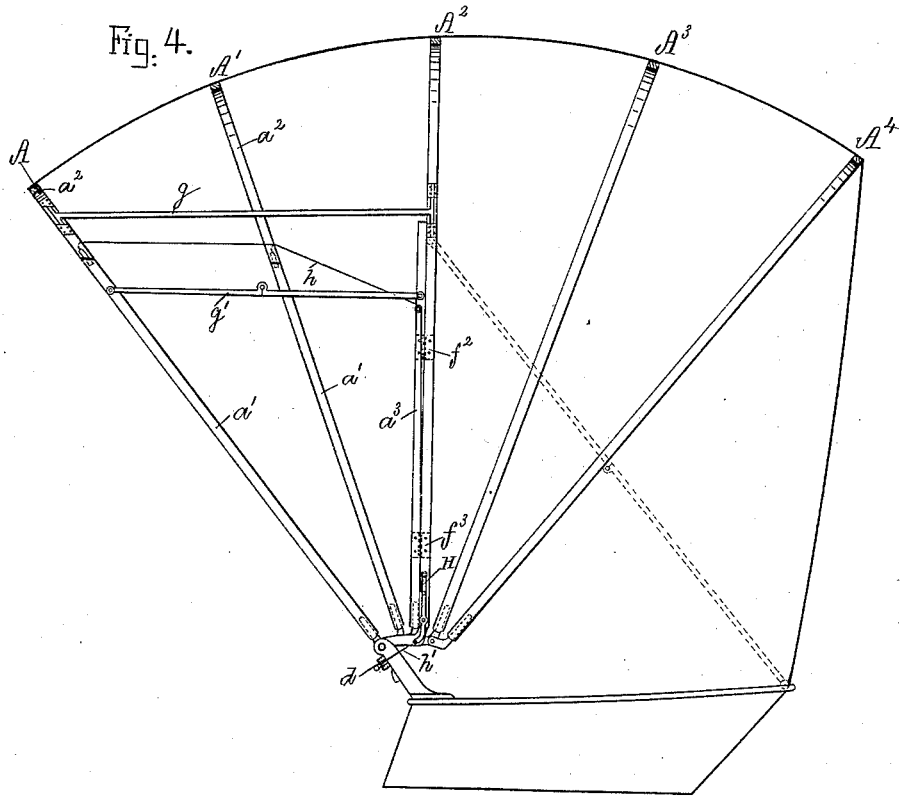
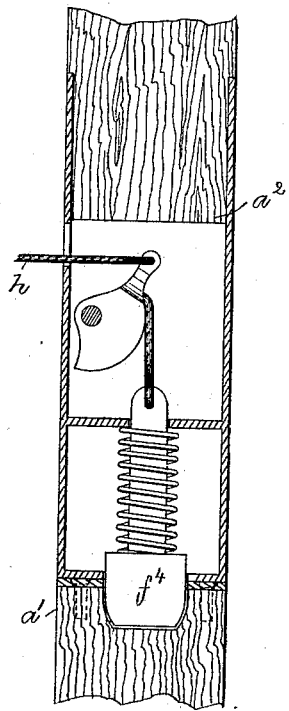
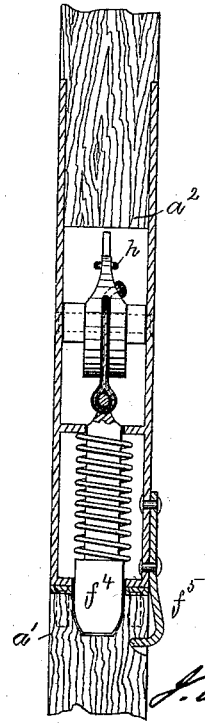

(No Model.) 3 Sheets—Sheet 3.
G. D. W. LENNON.
VEHICLE TOP.
No. 398,168. Patented Feb. 19, 1889.
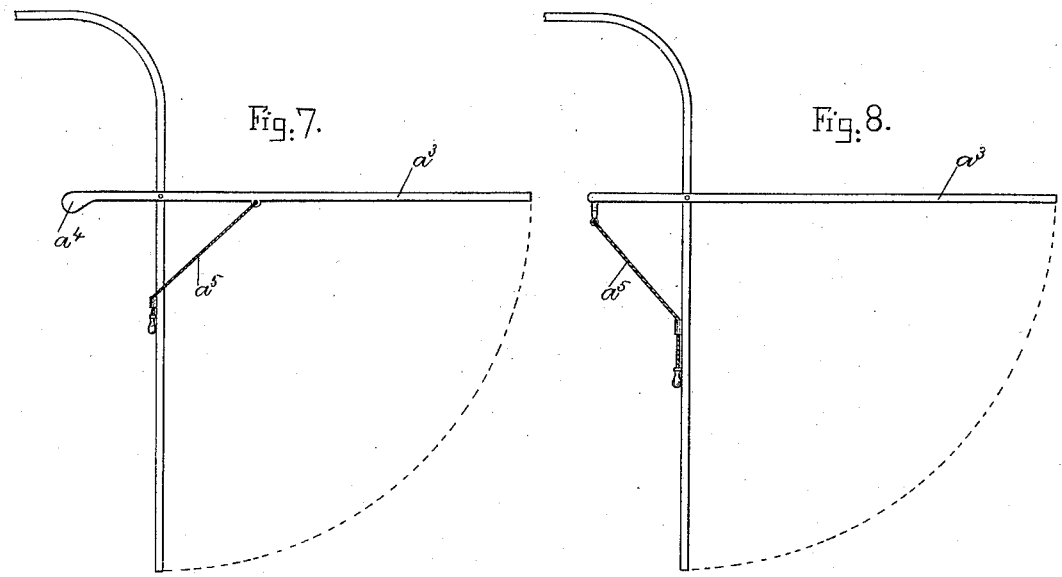
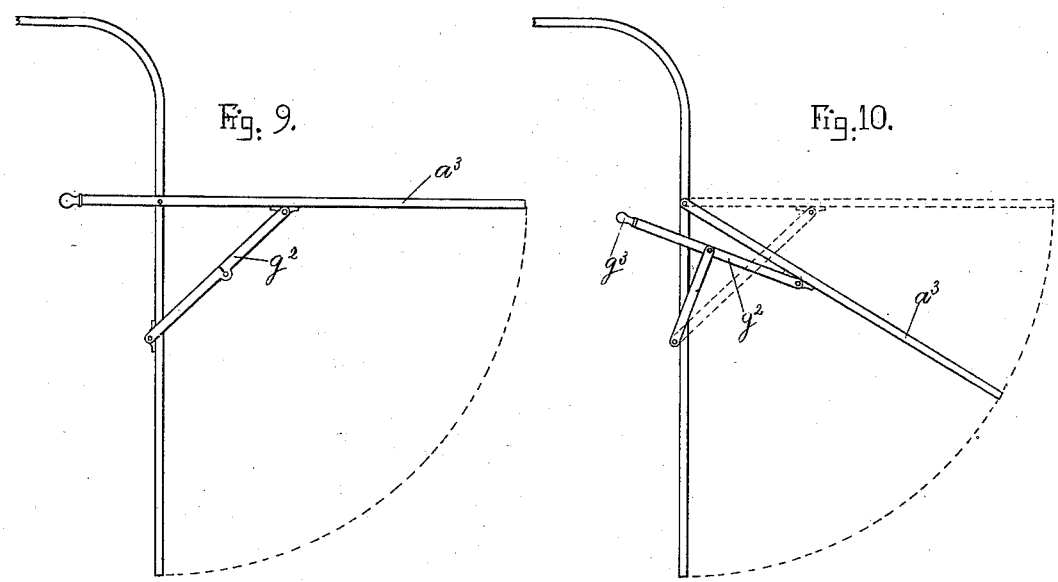
Witnesses,
L. W. Möller,
John R. Snow.
Inventor
Geo. D. W. Lennon
by his attorney,
J. E. Maynadier

UNITED STATES PATENT OFFICE.

GEORGE D. W. LENNON, OF BOSTON, MASSACHUSETTS.

VEHICLE-TOP.

SPECIFICATION forming part of Letters Patent No. 398,168, dated February 19, 1889.

Application filed June 18, 1888. Serial No. 277,404. (No model.)

*To all whom it may concern:*

Be it known that I, GEORGE D. W. LENNON, of Boston, in the county of Suffolk and State of Massachusetts, have invented an Improved Vehicle, of which the following is a specification, reference being had to the accompanying drawings, in which—

Figure 1:
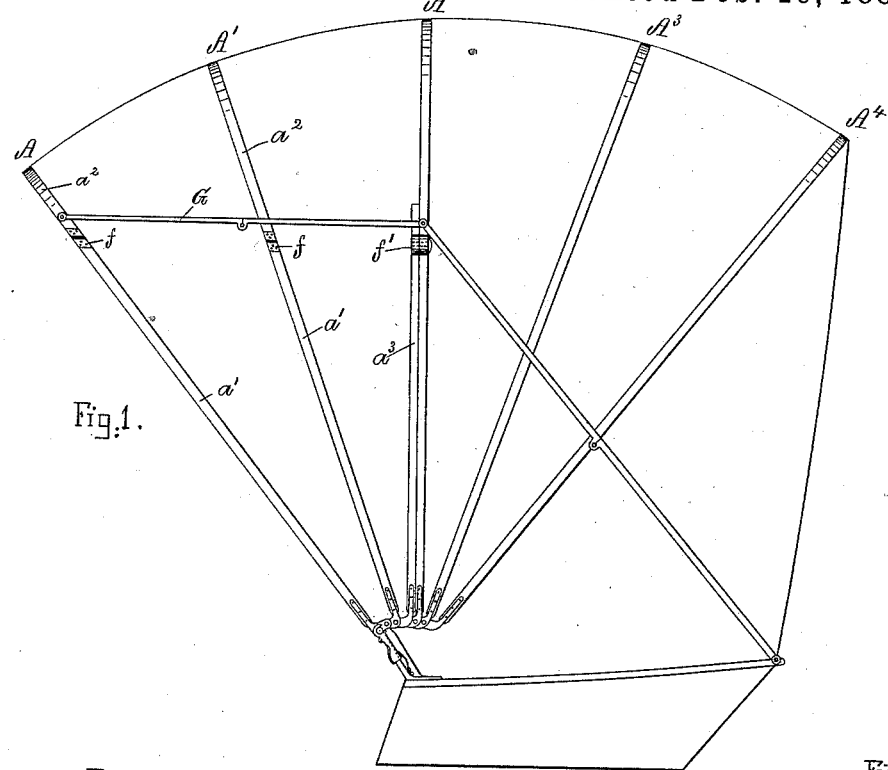
Figure 2:
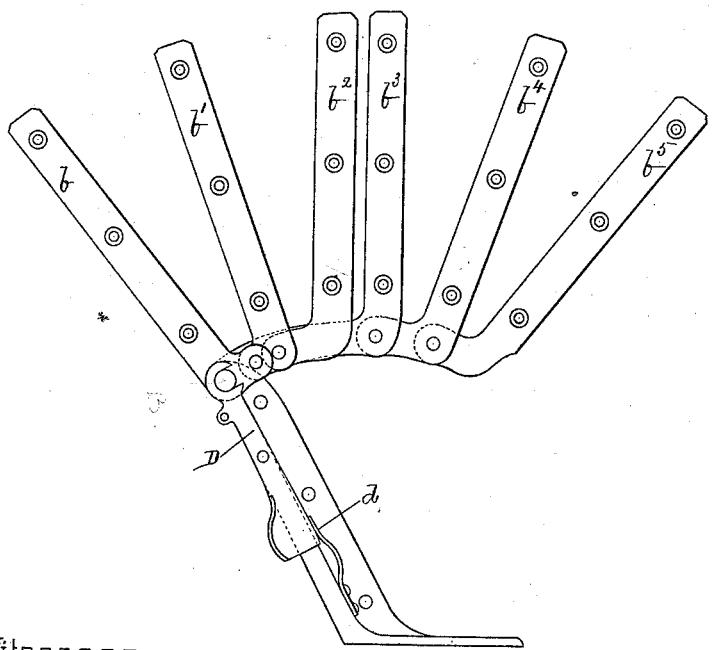
Figure 3:
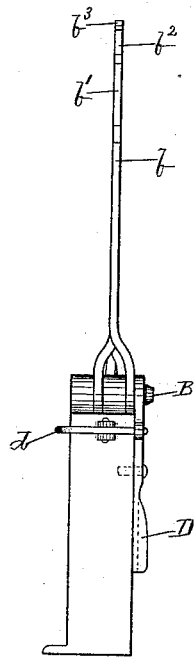

Figure 1 is a diagram illustrating a five-bowed buggy in side elevation, the cover being indicated by a single line. Fig. 2 is a side elevation of the irons. Fig. 3 is an edge view of Fig. 2. Fig. 4 is a diagram like Fig. 1, except that it illustrates an inner view and is modified somewhat. Figs. 5 and 6 are full-sized sectional views illustrating the manner of connecting the two parts of the bow shown in Fig. 4; and Figs. 7, 8, 9, and 10 are diagrams illustrating different devices for elevating the movable portion of the bow.

My invention relates to that class of vehicles commonly called "top-buggies." These vehicles as heretofore made consisted of a number of bows—usually three, four, or five—which support the cover, and which are so connected to the body of the vehicle that they can be folded back when required or be distended, then being held in place by suitable side braces or joints. When not folded back, the front bow in those buggies which have three bows and both the front bow and the one next to it in those which have more than three bows make an obstruction to ready ingress and egress; and the object of my invention is to improve this class of vehicles in this respect; and the main feature of my invention consists in forming the front bow in two parts, and arranging the lower part so that it may be gotten out of the way. In the case of a three-bow buggy this gives abundant room; but where there are more than three bows I prefer to make both the front bow and the bow next to it in accordance with my invention.

In the drawings, A is the front bow, and $A'$ $A^2$ $A^3$ $A^4$, the other bows of a five-bowed buggy. The bow A has its lower portion, $a'$, made in a separate piece, so that the bow itself consists of a main portion, $a^2$, and a separate side portion, $a'$. This is the only bow altered in the manufacture of three-bowed buggies; but where four or more bows are used the bow $A'$ is preferably made in the same way.

It will be clear that where the bow A or the bows A $A'$ are thus constructed the movable portions $a'$ may be turned up to allow easy ingress and egress, and this is the method I prefer, and is indicated in Fig. 1. The axis in this case being horizontal, the parts $a'$ may be hinged to the parts $a^2$, and the whole movable section, consisting of the parts $a'$ and their cover, may be controlled by a lever, $a^3$, whose fulcrum is supported by the unbroken bow $A^2$, the parts $a'$ and the lever $a^3$ being connected to the irons $b$ $b'$ $b^2$, as shown in Figs. 1, 2, and 3. The iron $b^2$ is made fast to the lever $a^3$ and is pinned to the iron $b'$, which is made fast to the movable part $a'$ of bow $A'$, and is itself pinned to the iron $b$. The iron $b$ is fast to the movable part $a'$ of bow A, and has an eye at its lower end which is engaged with the main pin B, upon which all the bows hinge. The bows $A^2$ $A^3$ $A^4$ are fast to the irons $b^3$ $b^4$ $b^5$, respectively, and are constructed and operated in the usual way. When the movable section, consisting of the movable parts $a'$ of the bows A $A'$, the lever $a^3$, the irons $b$ $b'$ $b^2$, and the covering, is to be lifted to allow ready ingress and egress, the latch D is forced in at its lower end against its spring $d$, so that the eye of the iron $b$ can be moved out away from the pin B, the movable section turning on the axes of the hinges $f$ and on the fulcrum $f'$ of the lever $a^3$.

When the movable parts $a'$ of the bows A $A'$ are detached from the pin B, the parts $a^2$ of the bows A $A'$ would sag, the front of the buggy-top falling downward and making the whole unsightly and impede the movement of parts $a'$, and for these reasons a second brace, $g$, (see Fig. 4,) is used in addition to the usual front brace, G, Fig. 1. This brace is hinged to the bow $A^2$, as shown in Fig. 4, and is connected at its front end to the part $a^2$ of bow A. Brace $g$ is merely auxiliary to G as long as the parts $a'$ are in place on pin B; but when removed from pin B the auxiliary brace $g$ supports the parts $a^2$ of the bows A $A'$ and prevents sagging of the front of the buggy-top. This auxiliary brace $g$ is the second feature of my invention. The lever $d$, Fig. 3, is an additional means for moving the catch D, which holds the iron $b$ and the irons $b'$ $b^2$ pivoted to it in place upon the pin B.

In Fig. 4 the movable parts $a'$ of bows A A' are arranged to turn upon a vertical axis, by which the part $a^3$ is hinged to the bow A² by the hinges $f^2$ $f^3$. In this case the movable section, consisting of the parts $a'$ $a^3$, the irons $b$ $b'$ $b^2$, and the cover which is connected to those parts, swing on a vertical axis, the axis of the hinges $f^2$ $f^3$ and the iron $b$ being connected and disconnected from the pin B, as before described, and shown in detail in Figs. 2 and 3; but the movable parts $a'$ of the bows A A' cannot be hinged to the parts $a^2$ of those bows. They are therefore connected by a bolt, $f^4$, as shown in Figs. 5 and 6, and as an additional precaution a side piece, $f^5$, is used, the lower portion of which engages in a groove near the upper end of the parts $a'$.

In order to keep the movable section (formed by the parts $a'$ $a^3$ and their connections) distended when the parts $a'$ are disconnected from the parts $a^2$, I use the brace $g'$ between the parts $a'$ and $a^3$, as shown in Fig. 4.

Figs. 7, 8, 9, and 10 are diagrams of devices by means of which the lever $a^3$ and the movable section connected with it may be operated. In Fig. 7 the lever $a^3$ is counterbalanced by the weight $a^4$ and the lever $a^3$ is pulled back to place by cord $a^5$. In Fig. 8 the cord $a^5$ is used to elevate the lever $a^3$, which falls back to place when the cord $a^5$ is released. In Fig. 9 a brace, $g^2$, is used to hold the lever $a^3$ in its elevated position. In Fig. 10 the brace $g^2$ has one of its parts prolonged to form a handle, $g^3$, so that the brace can be used both to raise and lower the lever $a^3$.

In Fig. 4 the catches $f^4$, as well as the lever $d$, are controlled by the lever H and the cords or chains $h$ $h'$. It will be obvious that a variety of devices may be used; but of all which have occurred to me I prefer those above described. It will also be clear that when the bows A A', or the bow A in the case of a three-bowed buggy-top, are made sectional, according to my invention, the movable parts $a'$ may be moved back on the pin B as a pivot when the movable parts $a'$ are disconnected from the part $a^2$, or the movable parts $a'$ may be wholly detached both from the pin B and the parts $a^3$ of the sectional bow, these being mere matters of detail of construction not essential to my invention, the main feature of which is the sectional bow A or A', composed of the bow part $a^2$, with one or both of its legs $a'$ made in a separate piece.

In practice, of course, both the legs $a'$ will be made separate from the parts $a^2$.

What I claim as my invention is—

1. In a folding carriage-top, the sectional bow above described, having the part $a^2$ in a separate piece from the part $a'$, substantially as and for the purpose specified.

2. In a folding carriage-top having one or more sectional bows, A A', the auxiliary brace $g$, substantially as and for the purpose specified.

GEO. D. W. LENNON.

Witnesses:
HENRY C. YOUNG,
JOHN R. SNOW.